United States Patent Office 3,323,031
Patented May 30, 1967

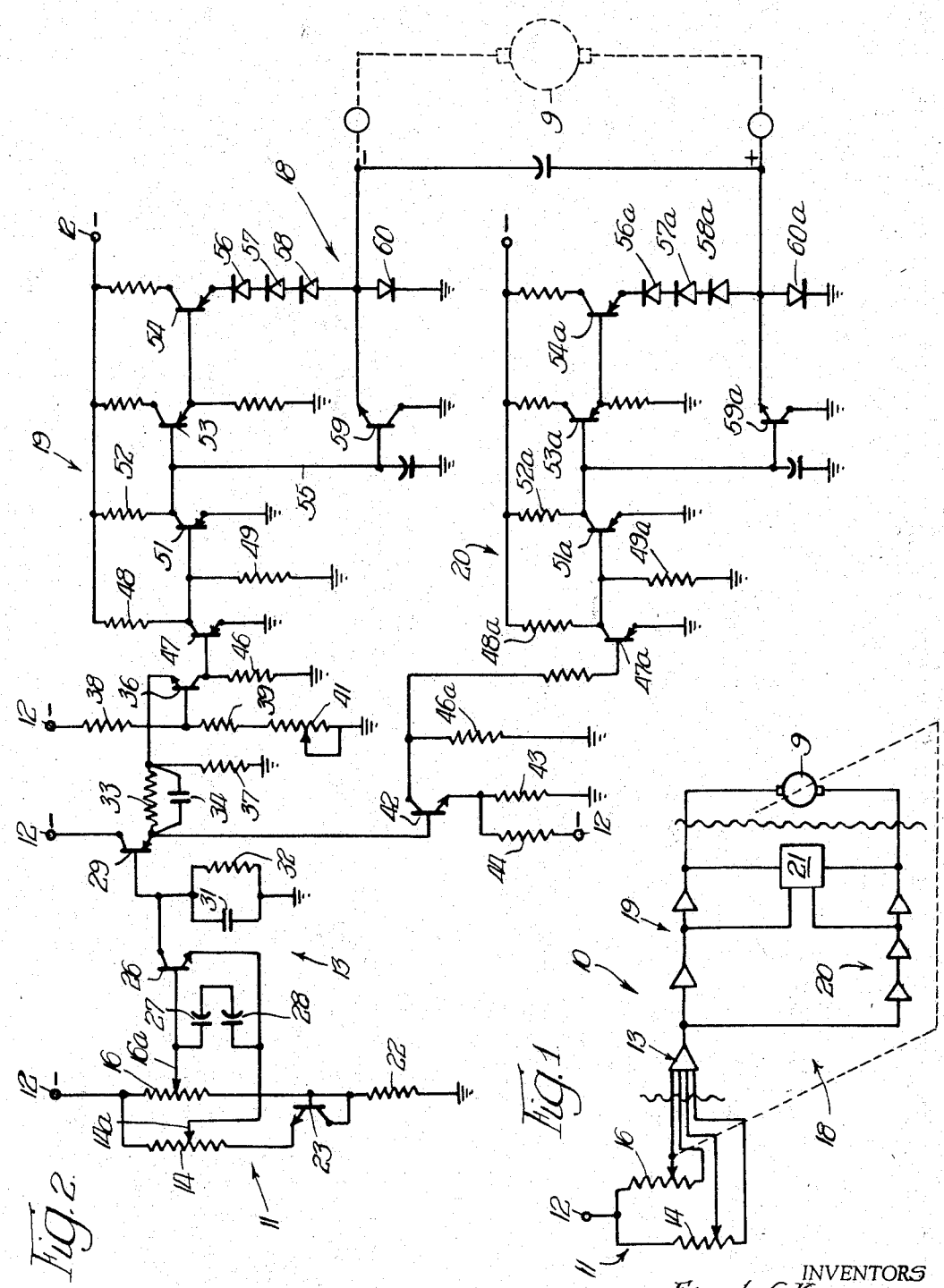

3,323,031
DUAL CHANNEL SERVO-AMPLIFIER CIRCUIT
Frank S. Kasper, Hazel Crest, and Robert L. Billingsley, Elmhurst, Ill., assignors to Amtron, Inc., Midlothian, Ill., a corporation of Illinois
Filed Nov. 15, 1963, Ser. No. 323,979
3 Claims. (Cl. 318—29)

This invention relates to motor control circuits and more particularly to a servo-amplifier circuit for controlling the selective operation of a direct current motor.

It is a prime object of the present invention to provide an improved servo-amplifier circuit for controlling the selective operation of a direct current motor.

It is a further object of the present invention to provide a servo-amplifier circuit which is highly stable, reliable in operation and rapidly responsive to input signals that dictate the controlled operation of a direct current motor associated therewith.

Still a further object of the present invention is to provide a motor control circuit which is economical both in construction and operation and which is ideally suited for effecting rapid cycling, manual positioning and the like of a motor controlled thereby.

Other objects and advantages of the present invention will become apparent from the following detailed description when considered in conjunction with the accompanying drawing, wherein:

FIGURE 1 is a simplified block diagram of a preferred embodiment of a servo-amplifier circuit embodying the features of the present invention; and FIGURE 2 is a detailed schematic of the servo-amplifier circuit depicted in FIGURE 1.

In general, the present invention is directed to a highly stable servo-amplifier circuit for effecting the controlled operation of a direct current motor. The circuit can be utilized in substantially any closed loop, position control system for effecting such functions as rapid cycling and manual positioning of a motor associated therewith. The circuit is characterized by reliability of operation, high accuracy and an extremely fast response time.

Quite generally, the servo-amplifier circuit includes a substantially balanced bridge input network that employs a first selectively adjustable control impedance element and a second variable impedance element that is responsive to the controlled operation of the motor. The selective adjustment of the first control impedance element is utilized to effect a desired degree of unbalance of the bridge input network, and this unbalance initiates the controlled operation of a motor connected to the output of the servo-amplifier circuit. In this connection, an amplifier network, which has a steady state or "dead band" range of operation, is connected across the output of the bridge input network and produces an amplified error voltage signal having a magnitude and polarity that is directly related to the degree and nature of the bridge unbalance. Preferably, a dual channel output network is connected across the output of the amplifier network and in circuit with the motor to be controlled. The output network supplies driving current to the motor in response to the error voltage signal produced by the amplifier network, when this latter network senses a degree of bridge unbalance that causes it to be operated beyond the limits of the "dead band" or steady state range.

The motor is selectively driven to carry out a desired external operation (e.g. the adjustment of a responsive control or the like). In addition, the driven motor concomitantly effects a variation in the second variable impedance element to reestablish the substantially balanced condition in the bridge input network and thereby return the amplifier network to the steady state or "dead band" range of operation. When this is effected, the controlled operation of the motor is terminated and the servo-amplifier circuit is automatically conditioned for a subsequent cycle of operation.

Referring in particular to drawings, FIG. 1 discloses a block diagram of a preferred embodiment of the servo-amplifier circuit when connected to a direct current motor 9. As shown, the amplifier circuit, which is generally designated by the numeral 10, includes a bridge input network 11 that is connected to a source of negative potential 12. The output of the bridge network 11 is connected to the input of an amplifier network 13 that has a steady state or "dead band" range of operation.

The bridge network 11, which is in a slightly unbalanced condition under steady state conditions to insure the normal operation of the network 13 in the "dead-band" range, is preferably formed by a first selectively adjustable control impedance element or potentiometer 14 and a second variable impedance element or potentiometer 16. The motor 9 is mechanically linked to the variable arm 16a of the potentiometer 16 so that the driving of the motor in response to an output signal from the servo-amplifier circuit results in the arm of the potentiometer 16 being concomitantly repositioned, as hereinafter described in detail.

When it is desired to effect the controlled driving of the motor 9, the variable arm 14a of the control potentiometer 14 is selectively adjusted so that the bridge network 11 is unbalanced to the degree necessary to bring the amplifier network 13 out of the "dead band" range of operation. In this connection, the output voltage produced by the bridge network is fed to the amplifier network 13, and the amplifier network responds thereto by producing an amplified error voltage signal. As shown in FIGURE 1, the amplifier network 13 is connected to a dual channel output network generally designated by the numeral 18 so that the amplified error voltage produced by the amplifier network results in one of the dual channels being rendered conductive to supply driving current to the motor 9.

Preferably, the dual channel output network 18 is a modified form of the circuit disclosed and claimed in United States Letters Patent No. 3,219,899. In this connection, the network 18 includes independently responsive channels 19 and 20 for supplying current to the motor 9 and thereby effect the selective driving thereof. Each of these channels 19 and 20 includes several stages of amplification. Although supplied from a single source of potential, each channel produces a supply of current such that the motor is driven in a first direction by the output from the channel 19 and in the opposite direction by the output from the channel 20. The output network 18 also includes an electronic brake 21 that brings the motor 9 to a halt immediately after driving current is no longer supplied thereto by either the channel 19 or the channel 20.

Referring specifically to FIG. 2, the detailed features of one preferred embodiment of the servo-amplifier circuit 10 will now be described. As shown, the potentiometers 14 and 16 form a part of the bridge network 11 that is connected to the source of negative potential 12 and to ground through a biasing resistor 22. More particularly, the potentiometer 14 is connected in series with an NPN transistor 23 and this series arrangement is connected in parallel with the potentiometer 16. The variable taps or arms 14a and 16a of the potentiometers 14 and 16, across which the bridge output voltage is developed, are connected to the emitter and base respectively of an NPN transistor amplifier 26. A pair of capacitors 27 and 28, which function to increase system stability, are connected between the arms of the potentiometers 14 and 16 and across the base-emitter junction of the transistor 26.

As is obvious from this circuit arrangement, the position of the variable arms 14a and 16a relative to the potentiometers 14 and 16 determines the bias applied to the base-emitter junction of the transistor 26. In a steady state condition, the bridge is substantially balanced and only a relatively small biasing potential is developed across the output thereof. In this connection, the steady state output from the bridge network is a small voltage sufficient to maintain the transistor 26 in a normal conductive state. This so-called normal conductive state is such that neither the channel 19 nor the channel 20 is rendered effective to supply driving current to the motor 9. However, if the normal or steady state conduction of the transistor 26 is sufficiently altered (i.e. due to a controlled variation in the position of the variable arm 14a) one of the channels of the output network 18 will be rendered effective to supply the necessary driving current to the motor 9.

Referring more specifically to the manner in which the bridge network 11 controls the conductive state of the transistor amplifier 26, the transistor 23, which is connected in series with the potentiometer 14, functions as a forward biased diode so that a voltage is normally developed thereacross. This developed voltage, which is at least as large as the necessary forward biasing potential for the base-emitter junction of the transistor 26, insures that the lower end of the control potentiometer 14 is sufficiently negative with respect to the lower end of the potentiometer 16. Accordingly, even if the arm 14a of the potentiometer 14 has been advanced to the lowermost position, the variable arm 16a of the potentiometer 16 can be positioned to place the transistor in the normal conductive state.

The resistor 22 (i.e. the voltage developed thereacross) maintains the emitter of the transistor 26 at a sufficiently negative potential so that the voltage developed at the collector thereof is sufficient for proper transistor action and is adequate to obtain necessary voltage swing in the following stages.

As shown in FIG. 2, the collector of the transistor 26 is connected to the base of a PNP transistor 29, which functions as an emitter follower, and to ground through a parallelly connected capacitor 31 and resistor 32. The capacitor 31 provides a low impedance path to ground for RF noise pickup, and the resistor 32 serves both as a collector load resistor for the transistor amplifier 26 and as a biasing resistor for the base of the emitter follower 29. More particularly, when the output from the bridge network forward biases the transistor 26, collector current flowing therethrough results in a voltage being developed across the load resistor 32, which voltage is applied to the base of the transistor 29. Therefore, the conductive state of the amplifier 26 dictates the magnitude of the negative voltage that is developed at the base of the transistor 29 and, accordingly, the conductive state of this emitter follower.

In this connection, the transistor 29 has the collector thereof connected directly to a source of negative potential and the emitter thereof connected to the input of the dual channel output network 18. More particularly, the emitter of the transistor 29 is connected to the input of the channel 19 through a parallelly connected resistor 33 and capacitor 34, which function as a lead network for improving system stability, and directly to the base of a normally non-conductive NPN transistor 42 that forms the input to the channel 20.

The resistor-capacitor network 33–34 connects the emitter of the transistor 29 to the emitter of a normally non-conductive transistor amplifier 36 and to ground through a load resistor 37. The load resistor 37 and the resistor 33 constitute a voltage divider network that contributes to the base-emitter bias for the transistor 36. A fixed but adjustable biasing potential for the base of the transistor 36 is similarly provided by a voltage divider network which includes a resistor 38, a resistor 39 and a variable resistor 41 that are serially connected between a source of negative potential and ground. In this latter connection, the adjustment of the variable resistor 41 dictates the voltage that is normally maintained on the base of the transistor 36 and thereby establishes one of the limits of the steady state operating range of the amplifier network 13 which, when operating in this range, does not result in driving current being supplied to the motor 9.

The other limit of this steady state or "dead band" operating range is dictated by the emitter bias established for the transistor amplifier 42. In this connection, the emitter of the transistor 42 is connected to ground through a resistor 43 and to a source of negative potential through a resistor 44. The resistors 43 and 44 form a voltage divider network and these components are selected to maintain a preselected negative voltage on the emitter of the transistor 42 that keeps this transistor non-conductive both when the servo-amplifier is in a steady state condition and when the channel 19 has been rendered effective.

It will be appreciated that the biasing conditions established for the base of the transistor 36 and the emitter of the transistor 42 dictate the magnitude of voltage which must be developed at the emitter of the transistor 29 in order to render either the channel 19 or the channel 20 effective and thereby supply driving current to the motor 9. That is, when the voltage developed on the emitter of the transistor 29 is sufficiently negative to overcome the negative potential applied to the base of transistor 36, the channel 19 is rendered effective. Alternatively, when the voltage developed on the emitter of transistor 29 is sufficiently positive to forward bias the transistor 42, the channel 20 is operative.

To crystallize the description of the servo-amplifier input circuitry, consideration should be given to the detailed and cooperative operation of the bridge input network 11 and the amplifier network 13. In this connection, when, for example, the variable arm 14a of the control potentiometer 14 is moved upwardly (i.e. signalling that the motor should be driven in a first direction to effect a desired external function), the emitter of the transistor 26 becomes relatively more negative than it was when the bridge network was in the aforedescribed substantially balanced condition. Accordingly, the transistor 26 is biased so that more collector current flows through the load resistor 32 and the voltage applied to the base of the emitter follower 29 becomes relatively more negative. As a consequence, the transistor 29 becomes more conductive and a greater voltage is developed across the resistor 33. Since the emitter of the transistor 29 thereby is rendered relatively more negative, the emitter of the transistor 36, which is connected thereto, becomes similarly biased.

Assuming that the relatively more negative potential applied to the emitter of the transistor 36 is sufficient to bias this transistor into a conductive state (i.e. the network 13 is caused to be operated outside of the "deadband" range), the operation of the channel 19 is thereby initiated and the motor 9 is driven by the output therefrom until the desired function has been performed. Inasmuch as the driven motor 9 is mechanically linked to and effects an adjustment in the position of the variable arm of the potentiometer 16, the motor not only effects the desired external operation but also results in the bridge input network being returned to the substantially balanced condition. Accordingly, the normal conductive state of the transistor is reestablished in anticipation of another controlled variation of the potentiometer arm 14a.

In a corresponding manner, when the variable arm 14a of the potentiometer 14 is moved downwardly, the conductive state of the transistor 26 is altered so that the collector of this transistor becomes relatively less negative, and this less negative potential is applied to the base of the emitter follower 29. As a result, the forward bias established across the base-emitter junction of the transistor 29 is reduced, and the potential developed at the emitter of this transistor becomes relatively less negative. Assuming that this potential change, which is applied to the base of the transistor 42, is sufficient to cause this transistor to be rendered conductive (i.e. the network 13 is again being operated out of the "dead-band" range), the operation of the channel 20 is initiated and driving current is supplied to the motor 9. The motor 9 is driven in the opposite direction by the output from the channel 20; however, the substantially balanced condition in the bridge network 11 and, consequently, the normal conductive state of the transistor 26 are reestablished.

From the foregoing, it will be appreciated that a controlled adjustment of the variable arm 14a creates an unbalanced bridge condition at the input to the amplifier network 13 which, to the exclusion of one of the channels, renders the other effective to supply driving current to the motor 9. However, since preselected biasing conditions are established for the transistor amplifiers 36 and 42 at the input of the channels 19 and 20, respectively, transient and uncontrolled conditions of bridge unbalance do not effect the undesired driving of the motor. Accordingly, by providing an input circuit having a "dead band" range of operation, the stability and reliability of the servo-amplifier are enhanced.

The functioning of the dual channel output network 18 in response to either the transistor 36 or the transistor 42 being rendered conductive can be appreciated from a consideration of the aforementioned co-pending application. However, to insure a complete understanding of the servo-amplifier of the present invention, consideration will now be given to the salient features of this output network, which is the preferred but not the exclusive type of output network that can be employed with the previously described input circuitry.

For purposes of this description, it will be assumed that a controlled adjustment of the potentiometer 14 has been effected to render the transistor 36 conductive. When the transistor 36 is rendered conductive, collector current flowing through this transistor results in a substantial voltage drop being developed across a load resistor 46. As shown, the load resistor 46 is connected between the junction of the collector of the transistor 36 with the base of an NPN transistor amplifier 47 and ground. The voltage developed across this load resistor results in the base of the transistor 47 becoming sufficiently negative so that this transistor is biased substantially into a saturated state of conduction. When this occurs, substantially all of the voltage applied to the collector of the transistor 47 from a source of negative potential is dropped across a load resistor 48, which is connected between the collector and the source as shown. However, a small portion of this applied voltage is dropped across a resistor 49 which is connected between ground and the junction of the collector of this transistor with the base of a PNP transistor amplifier 51.

Notwithstanding the small voltage that is developed across the resistor 49, the base of the transistor 51 approaches ground potential and this normally conducting transistor is cut off. The resulting diminishment of collector current flowing through the transistor 51 causes the voltage developed at the collector thereof to approach that of the source of negative potential (i.e. substantially no voltage is developed across the load resistor 52 that is connected in the collector circuit).

As shown, the collector of the transistor 51 is connected directly to the base of a first of a pair of emitter followers 53 and 54, each of which is a PNP transistor functioning as a power amplifier. Accordingly, the increased negative potential developed at the collector of the transistor 51 is applied to the base of the transistor 53 and both this transistor and the transistor 54 are thereby rendered conductive (i.e., each becomes forward biased). In a conventional manner, the emitter of the transistor 54 becomes substantially more negative and a plurality of serially connected diodes 56, 57 and 58, which are connected between this emitter and one input terminal of the motor 9, are forward biased to provide a path for current flow to the motor. This path for current flow is completed by a conducting (i.e., when the channel 20 is not rendered effective) NPN transistor 59a that is provided in the alternate channel 20 to perform a function corresponding to that of the NPN transistor 59 that is provided in the channel 19.

In this connection, both the transistors 59 and 59a are employed as emitter followers that individually operate to provide a conductive path from one side of the motor to ground. However, when the channel 19 is operative and the transistor 51 is cut off, the emitter follower 59 in the channel 19 is non-conductive due to the high negative potential that is applied directly to the base of this transistor by way of the conductor 55. On the other hand, since the channel 20 is precluded from being rendered effective when the channel 19 is in operation, the transistor 59a is placed in a conductive state to complete a path for current flow from the source of negative potential and through the transistor 54; the diodes 56, 57 and 58; the motor 9; and the emitter follower 59a to ground.

As previously described, current is supplied to the motor 9 until the desired function has been performed; and, as the motor is driven to effect this external function, an adjustment in the position of variable arm 16a of the potentiometer 16 is concomitantly effected to cause the amplifier network 13 to be returned to the steady state or "dead band" range of operation. When this occurs and the transistor 36 is again rendered non-conductive, the supply of driving current is cut off and the motor 9 is positively and rapidly brought to a stop.

The rapid stopping of the motor 9 is effected by the electronic brake 21 that forms a portion of the dual channel output network 18. More specifically and as described in the aforementioned copending application, the transistors 59 and 59a and the diodes 60 and 60a, which are connected in parallel therewith, respond to the generator action of the motor to effect dynamic braking when the supply of driving current is cut off.

In this connection and continuing with the assumption that the channel 19 has supplied driving current to the motor 9, the generator action of the motor develops a voltage across the motor terminals when current thereto is cut off. That is, a negative potential is supplied to the emitter of the transistor 59 so that this transistor is again rendered conductive. At the same time, a positive potential is developed at the opposite terminal of the motor so that the diode 60a is rendered conductive. Accordingly, a relative low impedance load (i.e., substantially a short circuit formed by the emitter-collector path of the transistor 59 and diode 60a) is clamped across the motor 9, the kinetic energy of the motor is expended as heat, and the motor comes to a stop substantially immediately.

The operation of the channel 20 that effects a driving of the motor 9 in the opposite direction is essentially the same as that described in connection with the channel 19. However, in this instance, it is the transistor 47a that is driven to saturation and the transistor 51a that is cut off. The emitter followers 53a and 54a perform a function corresponding to that effected by the transistors 53 and 54 and, similarly, produce the necessary current gain to insure the effective and efficient operation of the motor 9. Subsequent to the controlled operation of the motor 9 by the output from the channel 20, dynamic braking of the motor is also effected. However, in this instance it is the transistor 59a and the diode 60 that form the low impedance shunt across the motor to accomplish this braking.

The servo-amplifier circuit of the present invention is characterized by stability, high accuracy, high reliability, and extremely fast response. Moreover, the circuit is capable of effectively functioning over an extremely wide temperature range. As described above, the entire unit is transistorized so that it is small and compact and is economical both to construct and operate.

It should be understood that the foregoing is merely illustrative of the invention. Various modifications in the servo-amplifier circuit could be devised by those skilled in the art without departing from the invention, various features of which are set forth in the accompanying claims.

What is claimed is:

1. A servo-amplifier circuit for effecting the controlled operation of a direct current motor, which circuit comprises a bridge input network, said bridge input network including a first selectively adjustable control impedance element and a second variable impedance element responsive to the controlled operation of the motor, the selective adjustment of said first control impedance element effecting bridge unbalance and the production of an output signal by said bridge network, an amplifier connected across the output of said bridge input network, said amplifier being connected to said bridge input network so as to be in a normal conductive state when said bridge network is balanced and for producing amplified error voltage signals corresponding the output signals from said bridge network when said bridge network is unbalanced, a pair of output channels connected in circuit with the motor, said channels serving to selectively supply driving current to the motor in response to error voltage signals produced by said amplifier, each of said output channels including a normally nonconductive input circuit, each of said input circuits including means for biasing said input circuits so that the normal output of the normally conductive amplifier does not render either of said input circuits conductive, said input circuits being biased so that a dead band range of operation exists in which neither of said input circuits is rendered conductive notwithstanding unbalance of said bridge input network, only one of said normally nonconductive input circuits being rendered conductive when said bridge input network becomes sufficiently unbalanced to cause an error voltage signal to be produced by said amplifier so as to overcome the biasing of one of said input networks, one of said output channels responding to its input circuit being rendered conductive so that said one output channel supplies driving current to said motor, said motor being selectively driven by current supplied thereto from said one output channel and concomitantly effecting a variation in said second variable impedance element to reestablish a substantially balanced condition in said bridge input network whereby the supply of driving current to said motor is cut off.

2. A servo-amplifier circuit in accordance with claim 1 and wherein said input circuits of each of said output channels are transistorized circuits including selectively adjustable biasing means.

3. A circuit in accordance with claim 1 and wherein said amplifier network is a transistorized amplifier that is returned to its normal conductive state in response to variation in said second variable impedance element under the control of said motor and wherein said motor is brought to a rapid stop when the supply of driving current thereto is terminated.

References Cited

UNITED STATES PATENTS

| | | | |
|---|---|---|---|
| 2,846,630 | 8/1958 | Boyle et al. | 318—28 |
| 3,110,851 | 11/1963 | Plogstedt et al. | 318—28 |

BENJAMIN DOBECK, *Primary Examiner.*

JOHN F. COUCH, *Examiner.*